(12) United States Patent
Schoots et al.

(10) Patent No.: US 8,668,988 B2
(45) Date of Patent: Mar. 11, 2014

(54) POLYURETHANE PANEL

(75) Inventors: Nicola Schoots, Shepparton (AU);
Steven Schoots, Shepparton (AU)

(73) Assignees: Nicola Schoots, Shepparton (AU);
Steven Schoots, Shepparton (AU)

( * ) Notice: Subject to any disclaimer, the term of this patent is extended or adjusted under 35 U.S.C. 154(b) by 91 days.

(21) Appl. No.: 13/161,059

(22) Filed: Jun. 15, 2011

(65) Prior Publication Data

US 2012/0321899 A1 Dec. 20, 2012

(51) Int. Cl.
*B32B 27/40* (2006.01)
*B05D 5/00* (2006.01)
*C08G 18/00* (2006.01)

(52) U.S. Cl.
USPC .............................. 428/423.3; 156/71; 528/44

(58) Field of Classification Search
USPC .............................. 428/423.3; 156/71; 528/44
See application file for complete search history.

(56) References Cited

U.S. PATENT DOCUMENTS

| | | | |
|---|---|---|---|
| 3,923,926 A * | 12/1975 | Harada et al. ................... 528/66 |
| 4,410,667 A | 10/1983 | Porter et al. |
| 4,467,014 A | 8/1984 | Smith |
| 4,692,382 A | 9/1987 | Schmitt et al. |
| 4,938,819 A | 7/1990 | Ishii et al. |
| 5,837,363 A * | 11/1998 | Colafati ................... 428/311.11 |
| 6,544,449 B1 * | 4/2003 | Gardner ....................... 264/46.5 |
| 7,687,147 B2 * | 3/2010 | Helton et al. .............. 428/423.1 |
| 7,959,839 B2 * | 6/2011 | Debiasi et al. ................ 264/255 |
| 2007/0160793 A1 | 7/2007 | Cageao et al. |
| 2009/0324941 A1 * | 12/2009 | Benoit et al. .................. 428/339 |

FOREIGN PATENT DOCUMENTS

| AU | 582695 | 4/1989 | |
|---|---|---|---|
| EP | 23415 A2 * | 2/1981 | .............. E04D 13/14 |
| EP | 0376674 | 3/1995 | |

OTHER PUBLICATIONS

Rhino Linings Premium Protection, Rhino Tuff Stuff Technical Data Sheet, issued Dec. 2003.
Rhino Linings Premium Protection, Tuff Stuff A-Side, issued Oct. 14, 2008.
Rhino Linings Premium Protection, Tuff Stuff B-Side, issued Oct. 14, 2008.
MultiPanel Features and Benefits and Technical Data Sheet.
MultiPanel, "How to use MultiPanel".
Aptane Applied Polymers Material Safety Data Sheet.

* cited by examiner

*Primary Examiner* — Thao T. Tran
(74) *Attorney, Agent, or Firm* — Andrus, Sceales, Starke & Sawall, LLP (57) ABSTRACT

Building panels are ubiquitous in the building industry and are used to form walls, doors or other partitions, either of a structural or non-structural nature. Polyurethane can be formed into a panel which is rigid and can function in the same manner as conventional panels formed from wood and other material. The panel is able to be cut, screwed, drilled, painted, laminated or veneered. While laminating or veneering polyurethane panels with, for example, melamine or plywood, improves strength and rigidity, this is at a cost to flexibility and, consequently, the applicability of panels. The invention defined herein therefore relates to an improved polyurethane panel which overcomes the disadvantages of those which have gone before. The panel of the invention finds particular use, although not exclusive use, in building and construction.

34 Claims, 6 Drawing Sheets

POLYURETHANE PANEL

FIELD OF THE INVENTION

The present invention relates to an improved polyurethane panel. The panel finds particular use, although not exclusive use, in building and construction.

BACKGROUND

Building panels are ubiquitous in the building industry and are used to form walls, doors or other partitions, either of a structural or non-structural nature. Building panels are conventionally made from wood, most commonly plywood, wood chips or a composite material such as medium density fibreboard (MDF).

Engineered wood products, such as MDF, are made by breaking down hardwood or softwood residuals into wood fibres, and combining the fibres with wax and a resin binder. Panels are formed therefrom by applying high temperature and pressure. It is has been found that the resin material used in the manufacture of wood chip or composite-type panels is carcinogenic. Such panels are further disadvantageous in that they are relatively heavy and require additional components in order to be moisture resistant.

An alternative type of composite building panel is that produced from sand, cement and cellulose fibres, otherwise known as a fibre cement panel. Fibre cement panels are most often manufactured in a sheet form and are commonly used as cladding, but can also be used as tile underlay on decks and in bathrooms. While water and fire resistant, fibre cement panels are disadvantageous in that they are typically very heavy, where only thick panels have good impact resistance. Thin fibre cement panels are very fragile and must be handled carefully to avoid chipping and breakage.

A further alternative type of building panel is that made from moulded polyurethane. Polyurethane can be formed into panel which can function in the same manner as conventional panels formed from wood and other material. The panel is able to be cut, screwed, drilled, painted, laminated or veneered. Panels made from polyurethane avoid the use of the carcinogenic resin used in MDF panels, and are considerably lighter than similarly sized panels made from, for example, MDF, plywood or fibre cement. Polyurethane panels are also non-toxic, waterproof, flexible, and thermoformable. Polyurethane panels provide superior, cost efficient applications across many industries including, for example, marine, building and construction, landscaping, signage, transportation and refrigeration. The panels have excellent thermal and acoustic properties, and can also be made fire resistant. While laminating or veneering polyurethane panels with, for example, melamine or plywood, improves strength and rigidity, this is at a cost to flexibility and, consequently, the applicability of panels.

A need exists to provide improved polyurethane panels for use in building an other applications. The present invention addresses this need.

Discussion or mention of any piece of prior art in this specification is not to be taken as an admission that the prior art is part of the common general knowledge of the skilled addressee of the specification in Australia or any other country.

SUMMARY OF THE INVENTION

According to one aspect of the invention there is provided a coated polyurethane panel wherein the coating comprises one or more polyurethane elastomers.

The coated polyurethane panel according to the present invention is advantageous as it has substantially improved characteristics which may be selected from, but not limited to, strength, compressibility, flexibility or resistance. Such improved characteristics substantially reduces the fracturing and/or breakage of coated panels when formed into shapes without first requiring that the panel be heated to deformation temperatures in comparison to uncoated panels. This therefore increases the applicability of the coated polyurethane panel according to the invention when compared to uncoated panels.

Preferably, the coated panel of the invention is comprised of one or more polyols.

Further preferably, the coated panel of the invention is also comprised of one or more diisocyanates.

Even further preferably, the coated panel of the invention is comprised of one or more diisocyanates selected from the group consisting of: tetramethylene, hexamethylene, octamethylene and decamethylene diisocyanates, and their alkyl substituted homologs, 1,2-, 1,3- and 1,4-cyclohexane diisocyanates, 2,4- and 2,6-methyl-cyclohexane diisocyanates, 4,4'- and 2,4'-dicyclohexyl-diisocyanates, 4,4'- and 2,4'-dicyclohexylmethane diisocyanates, 1,3,5-cyclohexane triisocyanates, saturated (hydrogenated) polymethylenepolyphenylenepolyisocyanates, isocyanatomethylcyclohexaneisocyanates, isocyanatoethylcyclohexane isocyanates, bis(isocyanatomethyl)-cyclohexane diisocyanates, 4,4'- and 2,4'-bis(isocyanatomethyl)dicyclohexane, isophorone diisocyanate, 1,2-, 1,3-, and 1,4-phenylene diisocyanates, 2,4- and 2,6-toluene diisocyanate, 2,4'-, 4,4'- and 2,2-biphenyl diisocyanates, 2,2'-, 2,4'- and 4,4'-diphenylmethane diisocyanates, polymethylenepolyphenylenepolyisocyanates (polymeric MDI), and 1,2-, 1,3-, and 1,4-xylylen diisocyanates.

Even further preferably, the coated panel of the invention is coated with a polyurethane elastomer which is comprised of one or more polyols.

Even further preferably, the polyurethane elastomer is comprised of one or more diisocyanates.

Even further preferably, the polyurethane elastomer is comprised of one or more diisocyanates selected from the group consisting of: tetramethylene, hexamethylene, octamethylene and decamethylene diisocyanates, and their alkyl substituted homologs, 1,2-, 1,3- and 1,4-cyclohexane diisocyanates, 2,4- and 2,6-methyl-cyclohexane diisocyanates, 4,4'- and 2,4'-dicyclohexyl-diisocyanates, 4,4'- and 2,4'-dicyclohexylmethane diisocyanates, 1,3,5-cyclohexane triisocyanates, saturated (hydrogenated) polymethylenepolyphenylenepolyisocyanates, isocyanatomethylcyclohexaneisocyanates, isocyanatoethylcyclohexane isocyanates, bis(isocyanatomethyl)-cyclohexane diisocyanates, 4,4'- and 2,4'-bis(isocyanatomethyl)dicyclohexane, isophorone diisocyanate, 1,2-, 1,3-, and 1,4-phenylene diisocyanates, 2,4- and 2,6-toluene diisocyanate, 2,4'-, 4,4'- and 2,2-biphenyl diisocyanates, 2,2'-, 2,4'- and 4,4'-diphenylmethane diisocyanates, polymethylenepolyphenylenepolyisocyanates (polymeric MDI), and 1,2-, 1,3-, and 1,4-xylylen diisocyanates.

Even further preferably, the coated panel of the invention is comprised of up to about 50% by weight polyether polyol, preferably about 20 to 40% by weight, further preferably about 30 to 40% by weight.

Even further preferably, the coated panel of the invention is comprised of up to 70% by weight diphenylmethane diisocyanate, preferably 30 to 60% by weight, further preferably 50 to 60% by weight.

Some polyurethane materials can be vulnerable to damage from, for example, heat, light, atmospheric contaminants, and chlorine. Therefore, stabilisers can be added for protection. A blowing agent may also be added during the formation of the panel to produce a cellular structure via a foaming process. Thus, even further preferably, the panel of the invention and/or polyurethane elastomer coating further comprise additives selected from the group consisting of catalysts, blowing agents, surfactants, flame retardants, stabilizers, anti-discolouration compounds and pigments.

Even further preferably, the coated panel of the invention is comprised of up to about 10% by weight of one or more blowing agents, preferably about 2 to 8% by weight, further preferably about 3 to 6% by weight.

Even further preferably, the coated panel of the invention is comprised of polyurethane elastomer which comprises up to about 80% by weight, preferably greater than about 60% by weight of polyethylene/polypropylene glycol glyceryl ether.

Even further preferably, the coated panel of the invention is comprised of polyurethane elastomer which comprises up to about 20% by weight diethylene glycol, preferably about 10 to 18% by weight.

Even further preferably, the coated panel of the invention is comprised of polyurethane elastomer which comprises up to about 5% by weight diethyltoluenediamine, preferably up to about 2 to 4% by weight.

Even further preferably, the coated panel of the invention is comprised of polyurethane elastomer which comprises up to about 80% by weight 4,4'-diphenylmethane diisocyanate (MDI), preferably about 50% to 60% by weight.

Even further preferably, the coated panel of the invention is comprised of polyurethane elastomer which comprises modified 4,4'-diphenylmethane diisocyanate up to about 60%, preferably 20 to 40%.

Even further preferably, the coated panel of the invention is comprised of polyurethane elastomer which comprises diisooctyl phthalate up to about 30%, preferably 5 to 20%.

Even further preferably, the coated panel of the invention is substantially reduced from fracturing and/or breaking when the coated panel is substantially formed without first heating the panel to a deformation temperature.

Even further preferably, the coated panel of the invention is substantially formable at a temperature less than about 100° C.

Even further preferably, the coated panel of the invention is substantially formable at ambient temperature.

According to an embodiment of the above aspect, there is provided a coated polyurethane panel comprising a polyurethane panel coated with a polyurethane elastomer, wherein the panel is comprised of the following components:

Polyether Polyol: up to about 50%, preferably about 20 to 40%, further preferably about 30 to 40%
Diphenylmethane Diisocyanate: up to about 70%, preferably about 30 to 60%, further preferably about 50 to 60%
Blowing Agent: up to about 10%, preferably about 2 to 8%, further preferably about 3 to 4%
Fire Retardant: up to about 10%, preferably about 2 to 8%, further preferably about 3 to 4% and the polyurethane coating is comprised of the following components:

| | |
|---|---|
| polyethylene/polypropylene glycol glyceryl ether | up to about 80%, preferably greater than 60% |
| diethylene glycol | up to about 20%, preferably about 14% |
| diethyltoluenediamine | up to about 5%, preferably less than 3% |
| 4,4'-diphenylmethane diisocyanate (MDI) | up to about 80%, preferably 50 to 60% |
| modified MDI | up to about 60%, preferably 20 to 40% |
| diisooctyl phthalate | up to about 30%, preferably 5 to 20%. |

According to another aspect of the invention, there is provided a method of manufacturing a coated polyurethane panel as described above comprising the step of applying at least one layer of polyurethane elastomer to said panel.

According to another aspect, the invention provides for the use of the coated panel as described above for building and construction or blast mitigation.

According to this aspect, the coated panel of the invention may be used construct:
walls, floors, ceilings, windows, vents, doors, solar panels, rainwater catchment devices and septic holding tanks,
water features, or
planter boxes.

BRIEF DESCRIPTION OF THE DRAWINGS

In order to better present the invention, preferred embodiments of the invention will be described, by way of example only, with reference to the accompanying figures in which.

DETAILED DESCRIPTION OF THE PREFERRED EMBODIMENTS

Except where otherwise indicated, all numbers expressing quantities of ingredients, reaction conditions, and so forth used in the specification and claims are to be understood as being modified in all instances by the term 'about'. Accordingly, unless indicated to the contrary, the numerical parameters set forth in the following specification and attached claims are approximations that may vary depending upon the desired properties sought to be obtained by the present invention. At the very least, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The flexural modulus is the ratio of stress to strain in flexural deformation, or the tendency for a material to bend. It can be determined from the slope of a stress-strain curve produced by a flexural test (such as the ASTM D 790), and uses units of force per area. The flexural modulus of rigid polyurethane panels is dependent on composition as well as the thickness of the panel.

The tensile strength is the resistance of a material to longitudinal stress (tension); a measure of the force required to pull it apart. A suitable test for measuring tensile strength includes ASTM C 297-94.

The compressive strength is the maximum stress a material can sustain under crush loading. Compressive strength may be calculated by dividing the maximum load by the original cross-sectional area of a specimen in a compression test (such as the ASTM D 1621-94).

The compressive modulus is the measure of the compression of a sample at a specified load. It may also be measured using the ASTM D 1621-94 test as described above.

The shear strength is the maximum shear stress that can be sustained by a material before rupture. It is the ultimate strength of a material subjected to shear loading. It can be determined in a torsion test where it is equal to torsional strength. The shear strength is the maximum load required to shear a specimen in such a manner that the resulting pieces are completely clear of each other. Tests for shear strength include ASTM D-732 or ISO 1922:2001(E).

The shear modulus is defined as the ratio of shear stress to the shear strain. Tests for shear modulus also include ASTM D-732 or ISO 1922:2001(E).

Thermal resistance is the measure of a material's ability to resist heat flow. The formula for Thermal Resistance is R=L/k where (L) is the material's thickness and (k) is the material's Thermal Conductivity constant.

Unless otherwise stated, 'ambient temperature' is a term which refers to the temperature in a room, or the temperature which surrounds the object under discussion. Preferably, ambient temperature falls within the range of 15° C. to 30° C., further preferably 20° C. to 25° C.

Comprises/comprising and grammatical variations thereof when used in this specification are to be taken to specify the presence of stated features, integers, steps or components or groups thereof, but do not preclude the presence or addition of one or more other features, integers, steps, components or groups thereof.

Polyurethane panels and polyurethane elastomers comprise two separate components, namely a polyol component (A) and an isocyanate component (B), typically in the presence of a catalyst and other additives. A urethane linkage is produced by reacting an isocyanate group with a hydroxyl group of a polyol. Preferably, the isocyanate comprises at least two isocyanate functional groups and the polyol comprises at least two hydroxyl functional groups. The reaction product is a polymer containing the urethane linkage.

Polyols

Polyols can be derived from an initiator and monomeric building blocks. A preferred class of polyols are polyether polyols, which may be produced by the reaction of epoxides (oxiranes) with active hydrogen containing starter compounds. Another preferred class of polyols are polyester polyols, which may be produced by the polycondensation of multifunctional carboxylic acids and hydroxyl compounds. Polyols may be further classified as flexible or rigid polyols according to their end use, which may depend on the functionality of the initiator and their molecular weight. Initiator molecules having active hydrogens that will react with alkylene oxides to undergo polymerization may be selected to provide the polyol with a desired functionality and reactivity. Examples of active hydrogens, which are well known in the art, include the hydrogen on functional groups such as —OH, —NHR, —SH, —COOH, and —C(O)NHR, where R is hydrogen, alkyl, aryl, or aralkyl. Taking into account functionality, flexible polyols have molecular weights from 2,000 to 10,000 Daltons (number of OH groups from 18 to 56). Rigid polyols have molecular weights from 250 to 700 Daltons (number of OH groups from 300 to 700). Polyols with molecular weights from 700 to 2,000 Daltons (number of OH groups 60 to 280) may be used to add stiffness or flexibility to base systems, as well as increase solubility of low molecular weight glycols in high molecular weight polyols.

Polyether Polyols

Polyether polyols are available in a wide variety of grades based on their end use, but are all constructed in a similar manner. Polyols for flexible applications may employ low functionality initiators ('f') such as dipropylene glycol (f=2), glycerine (f=3) or a sorbitol/water solution (f=2.75). Polyols for rigid applications may employ high functionality initiators such as sucrose (f=8), sorbitol (f=6), toluenediamine (f=4), and Mannich bases (f=4). Preferably, rigid polyurethane foams may be produced from polyols having a nominal functionality of 2 to 8. It is desirable to produce rigid polyurethane foams from isocyanate-reactive compounds having functionality greater than 8 to achieve improved properties such as rigidity, density and dimensional stability. Preferable low molecular weight polyols for use as initiators for polyether polyols destined for rigid polyurethane foams synthesis are: glycerol, trimethylolpropane (TMP), triethanolamine, pentaerythritol, dipentaerythritol, α-methyl glucoside, xylitol, sorbitol and sucrose.

Polyols for use as initiators may have an aliphatic structure (glycerol, pentaerythritol, xvlirol, sorbitol) and others may have cycloaliphatic structures (α-methyl glucoside and sucrose). As a general rule, the polyether polyols derived from polyols with a cycloaliphatic structure, due to their intrinsic low mobility and higher rigidity, yield rigid polyurethane foams with superior physico-mechanical, thermal and fire resistance properties compared to the polyether polyols having aliphatic structures, at the same functionalities and hydroxyl numbers.

Another preferred group of initiators for use in the synthesis of polyurethane foams suitable for producing panels is the group of aliphatic or aromatic polyamines, having 2-3 amino groups/mol (primary or secondary groups) such as: ethylenediamine (EDA), diethylenetriamine, (DETA). ortho-toluenediamine (o-TDA) and diphenylmethanediamine (MDA).

Another preferred group of initiators, which may be used in the synthesis of polyether polyols for rigid polyurethane foams, is the group of condensates of aromatic compounds (for example phenols) with aldehydes (for example formaldehyde) such as Mannich bases or novolacs. The reaction of such initiators with alkylene oxides may yield aromatic polyols which confer to the resulting rigid polyurethane foams excellent physico-mechanical, thermal, and fire proofing properties as well as dimensional stability.

Propylene oxide may be added to the initiators until the desired molecular weight is achieved. Polyols extended with propylene oxide are terminated with secondary hydroxyl groups. In order to change the compatibility, rheological properties, and reactivity of a polyol, ethylene oxide is used as a co-reactant to create random or mixed block heteropolymers. Polyols capped with ethylene oxide contain a high percentage of primary hydroxyl groups, which are more reactive than secondary hydroxyl groups. Because of their high viscosity (470 OH groups sucrose polyol, 33 Pa·s at 25° C.), carbohydrate initiated polyols often use glycerine or diethylene glycol as a co-initiate in order to lower the viscosity to ease handling and processing (490 OH groups sucrose-glycerine polyol, 5.5 Pa·s at 25° C.). Graft polyols (also called filled polyols or polymer polyols) contain finely dispersed styrene-acrylonitrile, acrylonitrile, or polyurea (PHD) polymer solids chemically grafted to a high molecular weight polyether backbone. They may be used to increase the load bearing properties of low-density high-resiliency (HR) foam, or to add toughness to microcellular foams and cast elastomers. PHD polyols may also be used to modify the combustion properties of HR flexible foam. Preferably, solids content ranges from 14% to 50% by weight, further preferably 22% to 43% by weight. Initiators such as ethylenediamine and triethanolamine are used to make low molecular weight rigid foam polyols that have built-in catalytic activity due to the presence of nitrogen atoms in the backbone. They are used to increase system reactivity and physical property build, and to reduce the friability of rigid foam moulded parts. A special class of polyether polyols, poly(tetramethylene ether) glycols are made by polymerizing tetrahydrofuran. They may be used in high performance coating and elastomer applications.

Polyester Polyols

Polyester polyols are also suitable for making rigid polyurethane panels and fall into two distinct categories according to composition and application. Conventional polyester polyols are based on virgin raw materials and may be manufactured by the direct polyesterification of highpurity diacids and glycols, such as adipic acid and 1,4-butanediol. They may be distinguished by the choice of monomers, molecular weight, and degree of branching. While polyester polyols can be costly and difficult to handle because of their high viscosity, they offer physical properties not obtainable with polyether polyols, including superior solvent, abrasion, and cut resistance. Other polyester polyols may be based on reclaimed raw materials. They may be manufactured by transesterification (glycolysis) of recycled poly(ethyleneterephthalate) (PET) or dimethylterephthalate (DMT) distillation bottoms with glycols such as diethylene glycol. These low molecular weight, aromatic polyester polyols may be used in the manufacture of rigid foam, and can bring low cost and excellent flammability characteristics to polyisocyanurate (PIR) boardstock and polyurethane spray foam insulation.

Many polyols are polydispersive materials, being blends of two or more polyols each having specific molecular weights, so as to achieve a specific property balance. It is not unusual to find blends of polyether and polyester polyols, to give specific compromises in properties.

Specialty Polyols

Specialty polyols include polycarbonate polyols, polycaprolactone polyols, polybutadiene polyols, and polysulfide polyols. The materials may be used in elastomer, sealant, and adhesive applications that require superior weatherability, and resistance to chemical and environmental attack. Natural oil polyols derived from castor oil and other vegetable oils are used to make elastomers, flexible bunstock, and flexible moulded foam. Copolymerizing chlorotrifluoroethylene or tetrafluoroethylene with vinyl ethers containing hydroxyalkyl vinyl ether produces fluorinated (FEVE) polyols. Two component fluorinated polyurethane prepared by reacting FEVE fluorinated polyols with polyisocyanate may be applied to produce ambient temperature-curing paints/coatings. Fluorinated polyurethanes have excellent resistance to UV, acids, alkali, salts, chemicals, solvents, weathering, corrosion, fungi and microbial attack. Hence, such polyurethanes are highly preferred for high performance coatings/paints.

Isocyanates

As stated above, isocyanates with at least two functional isocyanate groups are desirable for the formation of polyurethane polymers. In this regard, an isocyanate that has two isocyanate groups is known as a diisocyanate. Diisocyanates are preferably manufactured for reaction with polyols in the production of polyurethanes. Volume wise, aromatic isocyanates account for the vast majority of global diisocyanate production. Aliphatic and cycloaliphatic isocyanates are also important building blocks for polyurethane materials, but in much smaller volumes. There are a number of reasons for this. First, the aromatically linked isocyanate group is much more reactive than the aliphatic one. Second, aromatic isocyanates are more economical to use. Aliphatic isocyanates are used only if special properties are required for the final product. For example, light stable coatings and elastomers can only be obtained with aliphatic isocyanates. Even within the same class of isocyanates, there is a significant difference in reactivity of the functional groups based on steric hindrance. In the case of 2,4-toluene diisocyanate, the isocyanate group in the para position to the methyl group is much more reactive than the isocyanate group in the ortho position.

Phosgenation of corresponding amines is the main technical process for the manufacture of isocyanates. The amine raw materials are generally manufactured by the hydrogenation of corresponding nitro compounds. For example, toluenediamine (TDA) is manufactured from dinitrotoluene, which then converted to toluene diisocyanate (TDI). Diamino diphenylmethane or methylenedianiline (MDA) is manufactured from nitrobenzene via aniline, which is then converted to diphenylmethane diisocyanate (MDI).

The two most preferred commercial, aromatic isocyanates are toluene diisocyanate (TDI) and diphenylmethane diisocyanate (MDI). TDI consists of a mixture of the 2,4- and 2,6-diisocyanatotoluene isomers. TDI-80 (TD-80) consists of 80% by weight of the 2,4-isomer and 20% by weight of the 2,6-isomer. This blend may be used in the manufacture of polyurethane flexible slabstock and moulded foam. TDI, and especially crude TDI and TDI/MDI blends may be used in rigid foam applications, but can be supplanted by polymeric MDI. TDI-polyether and TDI-polyester prepolymers may be used in high performance coating and elastomer applications. Prepolymers that have been vacuum stripped of TDI monomer have greatly reduced toxicity. Diphenylmethane diisocyanate (MDI) has three isomers, 4,4'-MDI, 2,4'-MDI, and 2,2'-MDI, and is also polymerized to provide oligomers of functionality 3 and higher.

Isocyanates will readily react with hydrogen atoms that are attached to atoms more electronegative than carbon. Of the many compounds fitting this description, those of primary interest for polyurethane forming reactions are listed in the table below.

| Active Hydrogen Compound | Typical Structure | Relative Reaction Rate Uncatalysed at 25° C. |
|---|---|---|
| Primary Aliph. Amine | $R-NH_2$ | 100,000 |
| Secondary Aliph. Amine | $R_2-NH$ | 20,000-50,000 |
| Primary Aromatic Amine | $Ar-NH_2$ | 200-300 |
| Primary Hydroxyl | $R-CH_2-OH$ | 100 |

-continued

| Active Hydrogen Compound | Typical Structure | Relative Reaction Rate Uncatalysed at 25° C. |
|---|---|---|
| Water | H—O—H | 100 |
| Carboxylic Acid | R—C(=O)—OH | 40 |
| Secondary Hydroxyl | R—CH(R)—OH | 30 |
| Ureas | R—NH—C(=O)—NH—R | 15 |
| Tertiary Hydroxyl | R—C(R)(R)—OH | 0.5 |
| Urethane | R—NH—C(=O)—O—R | 0.3 |
| Amide | R—C(=O)—NH$_2$ | 0.1 |

The amount of isocyanate required to react with the polyol and any other reactive additives is calculated in terms of stoichiometric equivalents. This theoretically stoichiometric amount of isocyanate may then be adjusted upwards or downwards, depending on the foam system and the required final properties. The amount of isocyanate used relative to the theoretical equivalent amount is known as the Isocyanate Index:

$$\text{Isocyanate Index} = \frac{\text{Actual amount of isocyanate used}}{\text{Theoretical amount of isocyanate required}} \times 100 \quad (2.18)$$

Variation of the index in a foam has a pronounced effect on the hardness of the final foam. This increase in hardness has been shown to be directly related to increased covalent cross-linking resulting from more complete consumption of isocyanate reactive sites caused by the presence of excess isocyanate groups.

In the production of flexible slabstock foams, the isocyanate index may range from 105 to 115. Within this range, the hardness of the foam can be readily and safely controlled. In general, foam becomes harder with increasing index. There is, however, a point beyond which hardness does not increase and other physical properties may suffer.

Increasing the isocyanate index may also affects the reaction profile. The presence of more unreacted isocyanate may also increases the tack-free time and slows the rate of foam cure.

The hardness of moulded foams may also be adjusted by varying the isocyanate index. In commercial processes, foam hardness may require adjustment from mould to mould. Isocyanate indexes in the range of 85 to 110 are known. By using suitable MDI-based isocyanates, it is possible to make foam that is stiffer at the edges than at the centre by using automatic index changing of the dispensed foam as it is poured into various sections of the mould.

Isocyanates may be further modified by partially reacting them with a polyol to form a prepolymer ('modified isocyanate'). A quasi-prepolymer is formed when the stoichiometric ratio of isocyanate to hydroxyl groups is greater than 2:1. A true prepolymer is formed when the stoichiometric ratio is equal to 2:1. Important characteristics of isocyanates are their molecular backbone, % NCO content, functionality, and viscosity.

Organic polyisocyanates containing heteroatoms such as, for example, those derived from melamine, can also be used.

Polyurethane Elastomers

Polyurethane elastomers are versatile thermoset plastics which are typically applied by spraying. Depending on the intended use, polyurethane elastomers can provide resistance to abrasion, impact and shock, temperature, cuts and tears, oil and solvents, aging, mould, mildew and fungus, and most types of chemicals.

Polyurethane elastomers may be formed by mixing a polyol and an isocyanate component. The selection of polyol, isocyanate and catalyst are made according to the properties required from the final elastomer. Consideration must be given to the conditions under which the urethane will be applied or sprayed. Additives, such as antistatic agents, colorants, and conductive fillers, may be added to the elastomer mix depending on the application.

The thickness of elastomer to be applied to a vertical or horizontal surface greatly influences the catalyst levels used. Certain catalysts, with their fast gel characteristics, are highly suitable for formulations that will be applied to vertical surfaces. This type of fast gel formulation will show little tendency to sag or run.

Conversely, if a gel time is made too fast, the possibility exists of restriction in the mixing sector of the spray gun. This is particularly true of guns employing impeller and static mixing heads. Over-catalysing will also lead to very high exothermic reaction temperatures.

Good flow-out for mirror like finishes when sprayed onto horizontal surfaces is obtained by using less active catalysts. The level must, however, not be kept too low, or the full cure may be extended beyond practical limits. If this happens, polymer growth within the elastomer becomes too slow with consequent foaming. A good balance of catalysts is therefore necessary.

The viscosity of the two components should also receive considerable attention. While a minority of the types of spray equipment are capable of mixing materials of differing viscosities, it is considered safe practice to formulate the two components to within 100 cycles per second of each other. This ensures adequate mixing in all types of equipment.

Additives

Additives may be added to the rigid polyurethane panel or the elastomeric polyurethane depending on the function required. For example, a rigid polyurethane panel can be made fire resistant by incorporating a fire retardant during the mixing of the polyol and isocyanate components. For example, flame retardant compounds which may be employed may include tri(2-chloroethyl) phosphate, tri(2-chloroisopropyl)phosphate, tri(1,3-dichloroisopropyl)phosphate, pentabromodiphenyloxide, chlorinated diphosphate ester, tris(2,3-dibromopropyl)-phosphate, tetrakis(2-chloroethyl)ethylene phosphonate, pentabromodipheny oxide, tris (1,3-dichloropropyl) phosphate, molybdenum trioxide, ammonium molybdate, ammonium phosphate, tricresyl phosphate, 2,3-dibromopropanol, hexabromocyclododecane, and dibromoethyldibromocyclohexane. Such agents can also be added to the elastomeric coating.

For example, to protect against oxidation reactions, antioxidants are may be added. Various antioxidants are available such as monomeric and polymeric hindered phenols. Compounds which inhibit discoloration caused by atmospheric pollutants may also be added. These are typically materials with tertiary amine functionality that can interact with the oxides of nitrogen in air pollution. Anti-mildew additives can also be added.

A distinction can be made between chemical and physical blowing agents. The chemical blowing agents include water, whose reaction with the isocyanate groups leads to the formation of $CO_2$. The density of the foam is controlled by the amount of water added, with preferably used amounts being from 1.5 to 5.0 parts, based on 100.0 parts of polyol. In addition physical blowing agents, (e.g. chlorofluorohydrocarbons, methylene chloride, acetone, 1,1,1-trichloroethane, etc.) can also be used. Optionally, organic blowing agents may be used in conjunction with water although the use of such blowing agents is generally being curtailed for environmental considerations. The preferred blowing agent for use in the production of the present foamed isocyanate-based polymer comprises water.

Several different pigments can be used, preferably in the elastomeric compositions. Inorganic pigments which are useful include titanium dioxide, silica, iron oxides, talc, mica, clay, zinc oxide, strontium chromate, zinc chromate, carbon black, lead chromate, molybdate orange, calcium carbonate, and barium sulfate. Organic pigments can also be used.

In summary, additives for rigid polyurethanes or elastomers preferably include those selected from a group consisting of catalysts, blowing agents, surfactants, flame retardants, stabilizer, anti-discolouration compounds and pigments.

Thermoforming

The thermoforming of the polyurethane panels, particularly rigid panels, can be accomplished in various ways. Polyurethane panels may be heated to a deformation temperature of between about 100° C. to about 300° C. Preferably, the panel may be heated to a deformation temperature of between about 150° C. to about 200° C. The choice of deformation temperature will be dependent on the thickness and composition of the panels.

Thermoforming may be performed with the aid of infrared radiators, hot air ovens, contact hot plates or other heating means. Thermoforming may also be performed under vacuum. Heated polyurethane panels can be placed in a forming tool or mould which is maintained between about 20° C. to about 100° C., preferably between about 25° C. to about 75° C., and formed therein with or without the application of pressure. Preferably, pressure is applied to the mould to obtain the shape of the desired article. Alternatively, heated panels may be bent manually with the aid of a heat source, such as a heat gun or heat lamps, and without the use of a mould. In either case, the moulded panel is held in position until the panel cools. Importantly, bending a polyurethane panel without first heating the panel to an appropriate deformation temperature can result in fracturing or breakage.

Moulds may be made of economical materials such as wood, thermosetting plastics, gypsum or ceramics.

Coated Polyurethane Panels According to the Invention

A polyurethane panel that is suitable to construct the coated panel of the invention can be manufactured by preparing a homogenous mixture of the polyol and isocyanate components and dispensing the mixture into a mould. The mould can be of any shape, but is preferably rectangular. The method for forming the panel according to this example is as generally described in Australian Patent Application No. 2003200383. Briefly, the mould containing the mixture is closed by a lid. The mould is then conveyed to press table so that the mould is pressed closed until the mixture cures. Once cured, the mould is opened and the panel is removed. The moulded panel can then be processed in a similar manner to conventional wooden or fibre based panels by, for example, painting, veneering or laminating the panel and cutting the panel to size.

A preferred polyurethane panel that is used for the present invention includes the following components:
Polyether Polyol: up to about 50%, preferably about 20 to 40%, further preferably about 30 to 40%
Diphenylmethane Diisocyanate: up to about 70%, preferably about 30 to 60%, further preferably about 50 to 60%

The panel may also include the following optional components:
Blowing Agent: up to about 10%, preferably about 2 to 8%, further preferably about 3 to 4%
Fire Retardant: up to about 10%, preferably about 2 to 8%, further preferably about 3 to 4%.

A panel according to this example is manufactured as a high-density rigid polyurethane foam panel having the product name 'Aptane™ P258/B900 Multipanel' by Ariel Industries Pty. Ltd, 26 Kembla Street, Victoria 3192 Australia. The panel has a flexural modulus at 100 mm of about 120330 kPa, and at 50 mm of about 64035 kPa (ASTM D790).

A polyurethane elastomer that is suitable to coat polyurethane panels, particularly the above preferred panel, is comprised of the following components:

Component A

| | |
|---|---|
| polyethylene/polypropylene glycol glyceryl ether | up to about 80%, preferably greater than 60% |
| diethylene glycol | up to about 20%, preferably about 14% |
| diethyltoluenediamine | up to about 5%, preferably less than 3% |

Component B

| | |
|---|---|
| 4,4'-diphenylmethane diisocyanate (MDI) | up to about 80%, preferably 50 to 60% |
| modified MDI | up to about 60%, preferably 20 to 40% |
| diisooctyl phthalate | up to about 30%, preferably 5 to 20%. |

A polyurethane elastomer according to this example is manufactured by Rhino Linings Australasia Pty Ltd, 501-505 Olsen Avenue, Molendinar, Queensland 4214, Australia under the product name 'Tuff Stuff™' 'Rhino Lining™' trade marks.

Figure 1:
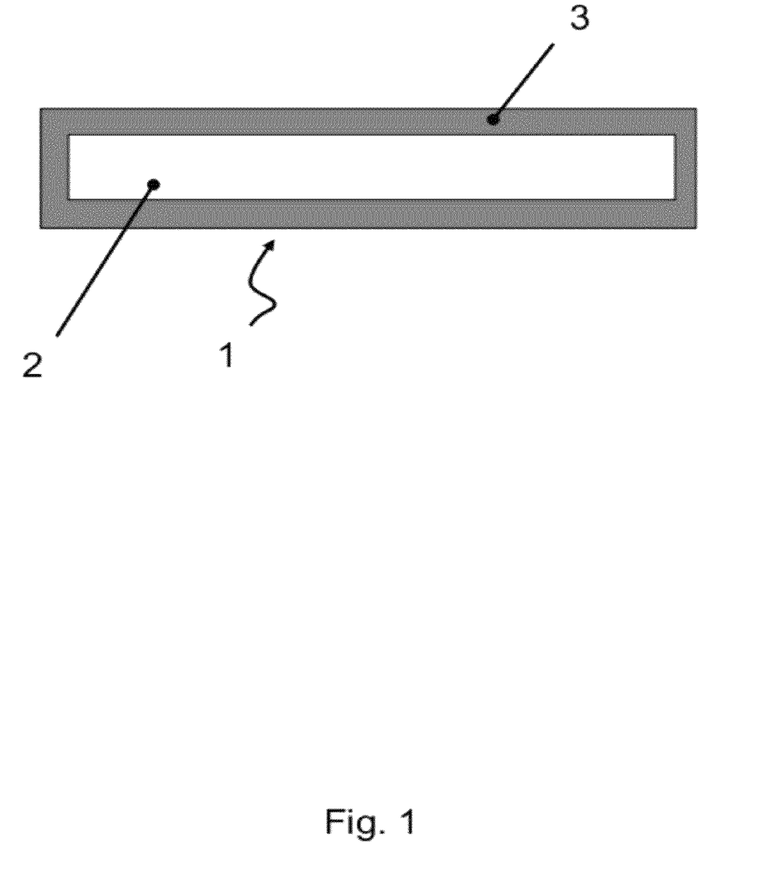
FIG. 1 is an illustration of a transverse crossection of an embodiment of the coated polyurethane building panel according to the invention.

Preferably, the Tuff Stuff™ elastomer is applied by spraying using a spray gun with a static mixing nozzle at a ratio of A:B of between about 1:1 to about 1:2, further preferably 1:1.5 to 1:1.9. Panels may be sprayed vertically or horizontally. An illustration of a transverse crossection of a coated panel according to the invention is shown in FIG. 1. The figure shows a coated panel (1) which comprises a polyurethane panel (2) coated with a polyurethane elastomer (3).

The coated panel according to the invention has improved characteristics which can be selected from, but not limited to, flexibility, compressibility, shear strength, tensile strength, fire resistance, flammability, moisture resistance, mould resistance, water resistance, insect/parasite resistance, blast mitigation and/or acoustic properties. This enables use of the coated panel in building and construction, as well as other sectors, such as the military.

Further examples of the invention are described below. However, it should be noted that the invention should not be limited to these examples, and that the invention is susceptible to variations, modifications and/or additions other than those specifically described, and it is to be understood that the invention includes all such variations, modifications and/or additions which fall within the scope of the claims.

Example 1

Figure 2:
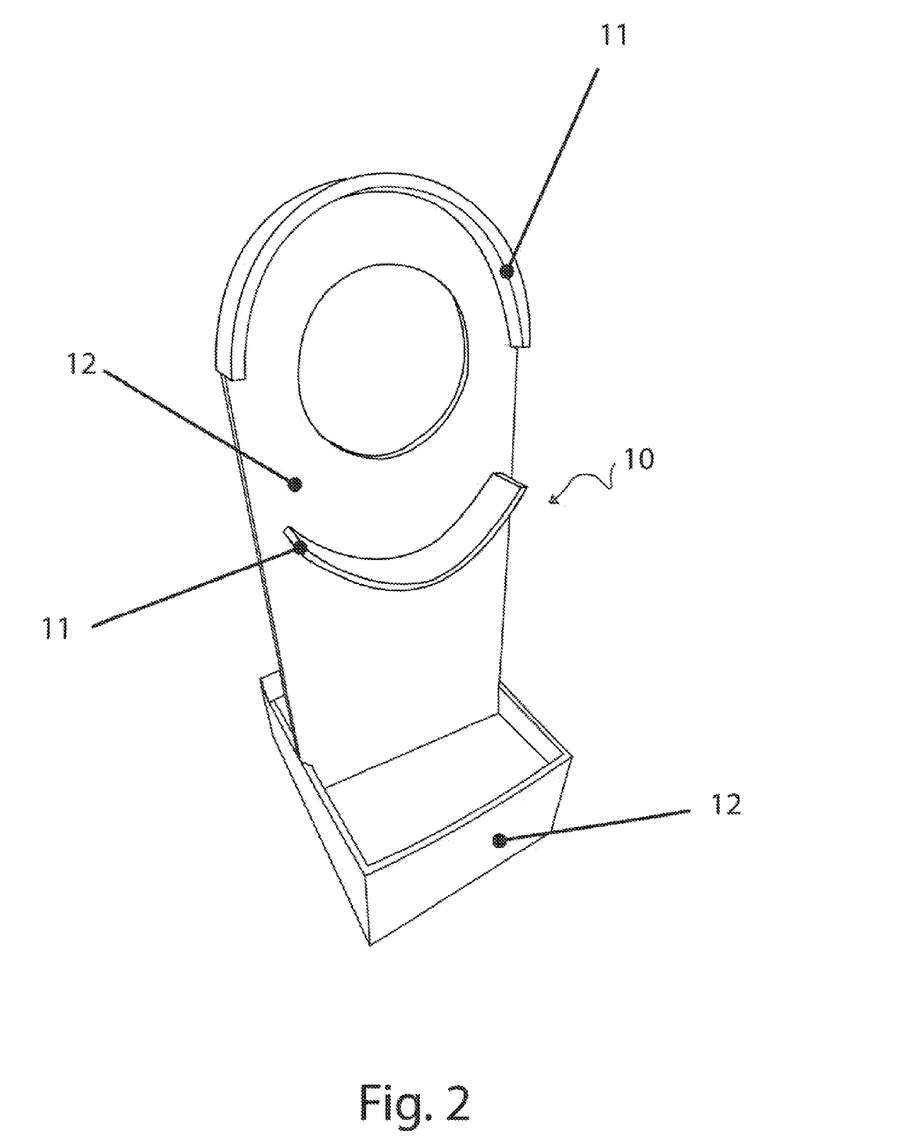
FIG. 2 shows a front perspective view of a water feature made from an embodiment of the coated polyurethane building panel according to the invention.

In one exemplary embodiment, FIG. 2 shows a water feature (10) made from an embodiment of the coated polyurethane panel according to the invention. Preferably, the water feature (10) according to this embodiment is first cut from Aptane™ P258/B900 Multipanel. Structures requiring curves (11) are deformed into shape using heat. The water feature (10) is then assembled by fixing flat structures (12) and curved structures (11) together using appropriate adhesives and fixings. The assembled water feature is then sprayed with Tuff Stuff™ polyurethane elastomer and the coating allowed to set.

Alternatively, the water feature (10) according to this embodiment may be cut from Aptane™ P258/B900 Multipanel, where structures requiring curves (11) are deformed into shape using heat. The separate pieces (11 and 12) are then sprayed with Tuff Stuff™ polyurethane elastomer, and the coating allowed to set. The water feature (10) can be shipped flat-packed which reduces transportation costs. It may be assembled onsite using appropriate fixings and adhesives, preferably water resistant or water proof adhesives.

The water feature (10) shown in FIG. 2 is 700 mm×600 mm×1300 mm and fabricated from 16 mm MultiPanel coated with at least a 1 mm thick layer of Tuff Stuff™ polyurethane elastomer. The water feature can be painted using an appropriate paint, preferably weather resistant paint, to achieve different colour finishes. Alternatively, the Tuff Stuff™ polyurethane elastomer may be pigmented to achieve different colour finishes.

Example 2

Figure 3:
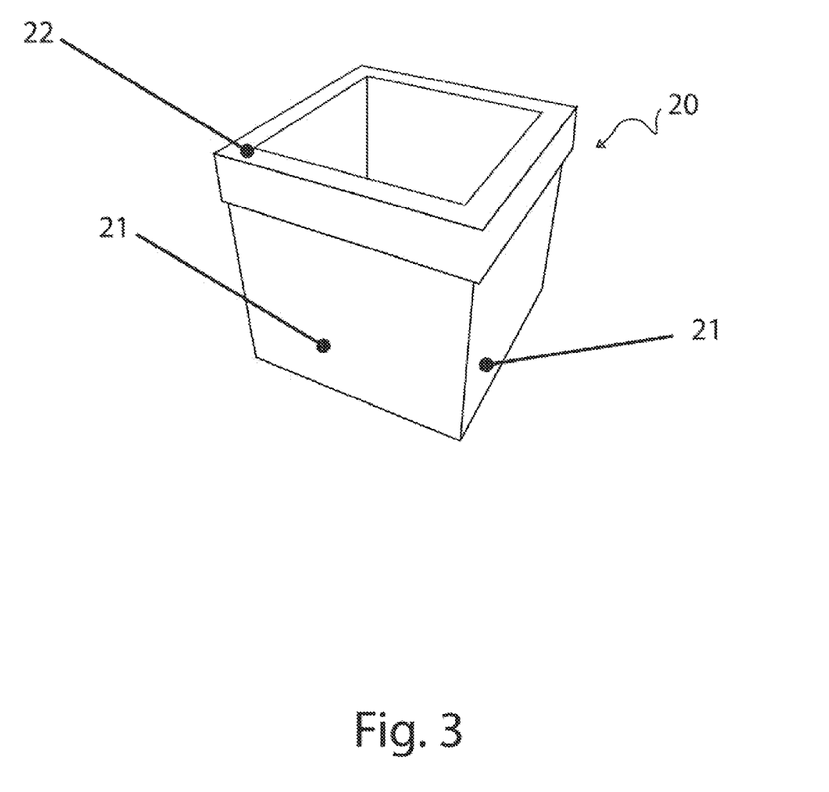
FIG. 3 shows a perspective view of a planter box made from an embodiment of the coated polyurethane building panel according to the invention.
Figure 4:
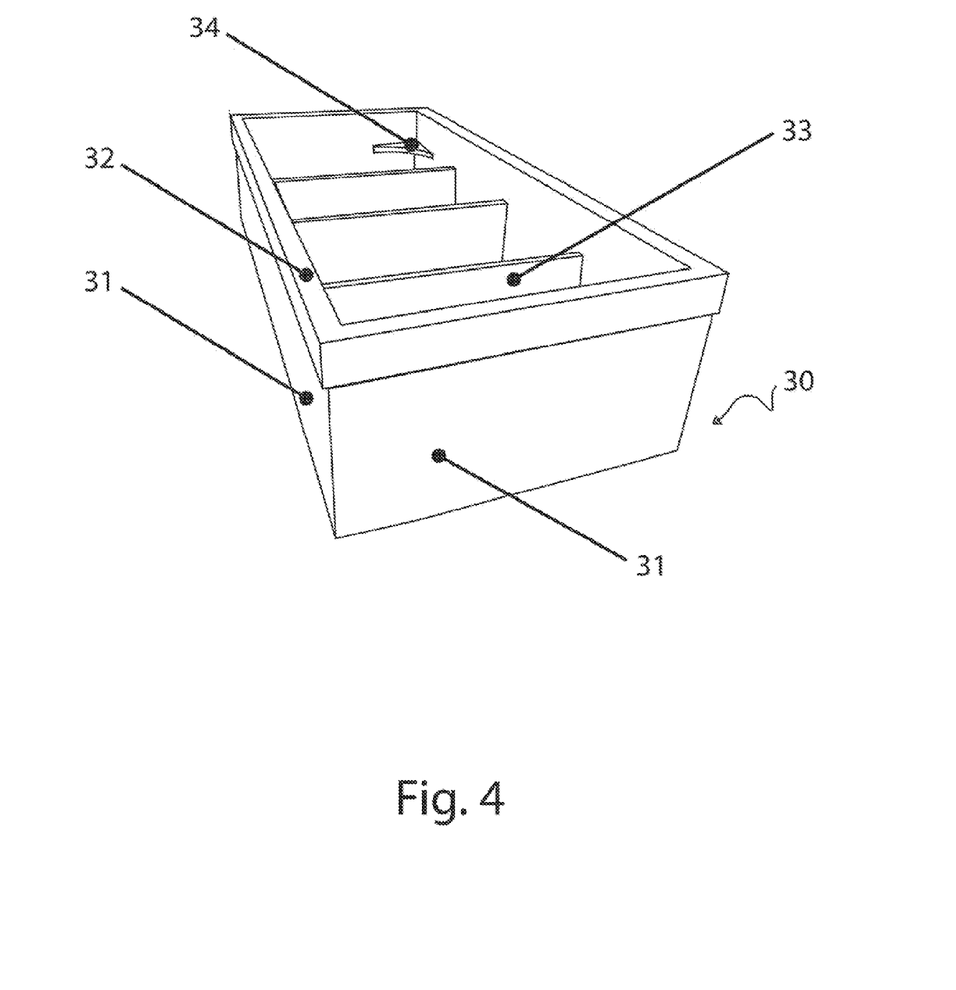
FIG. 4 shows a perspective view of a large planter box made from an embodiment of the coated polyurethane building panel according to the invention.

In another exemplary embodiment, FIGS. 3 and 4 show a planter boxes (20 and 30, respectively) made from an embodiment of the coated polyurethane panel according to the invention.

Similarly to Example 1, pieces which form the planter box (20 or 30) are cut from a sheet of Aptane™ P258/B900 Multipanel, preferably 25 mm thick. Walls of the planter boxes (21 and 31, respectively) are assembled using appropriate fixings and adhesives. According to the embodiments shown, the planter boxes may include a top edge (22 and 32, respectively) made from 100 mm×500×5 mm thick Aluminium Angle which is mitred and welded. The Aluminium Angle adds strength to the top edge as well as providing an aesthetically pleasing finish. The boxes are then sprayed with at least a 1 mm thick layer of Tuff Stuff™ polyurethane elastomer.

Assembly of the planter boxes (20 or 30) can occur onsite using coated polyurethane panel pieces shipped flat-packed and appropriate adhesives and fixings as described in Example 1, with or without the added Aluminium Angle (22 or 32). The boxes (20 or 30) may be painted or the Tuff Stuff™ polyurethane elastomer may be pigmented to achieve different colour finishes as described above.

Large planter boxes (30) may include further support features to provide added strength. For example, as show in FIG. 3, the large planter box includes 3× load bearing battens (33) secured equally spaced across width of planter box, and 2× gussets per corner (34) to provided added strength.

Example 3

Figure 5:
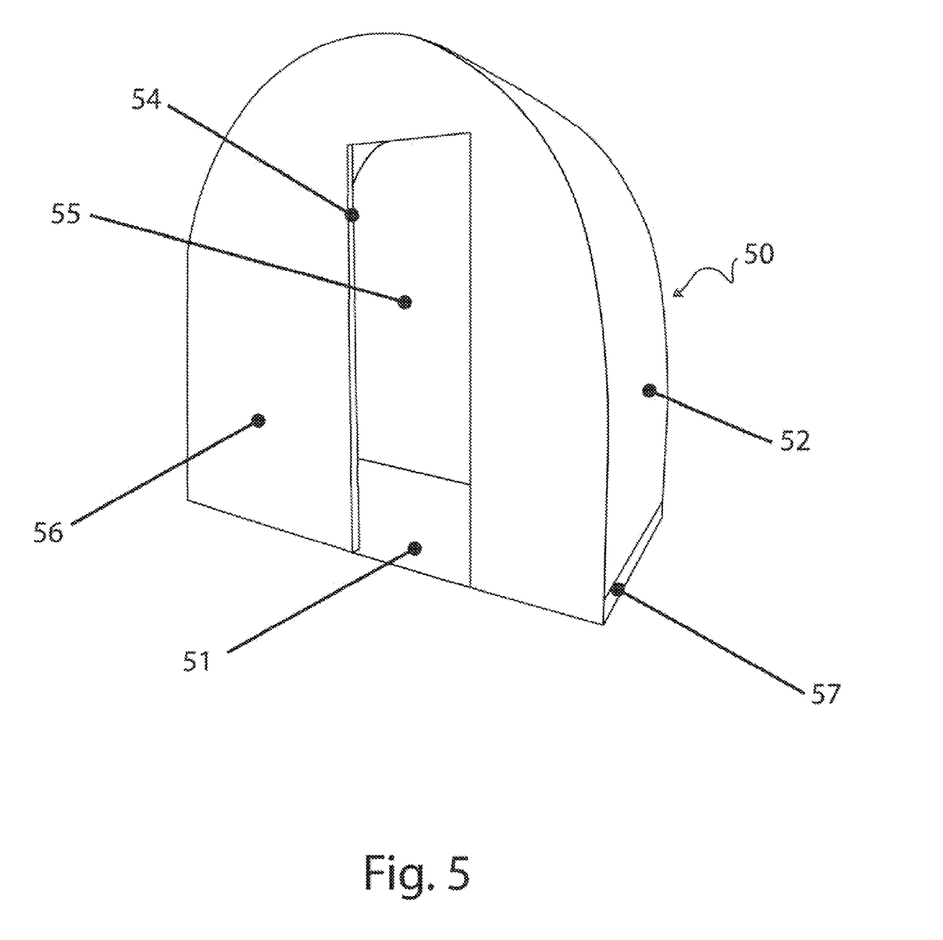
FIG. 5 shows a front perspective view of housing made from an embodiment of the coated polyurethane building panel according to the invention.
Figure 6:
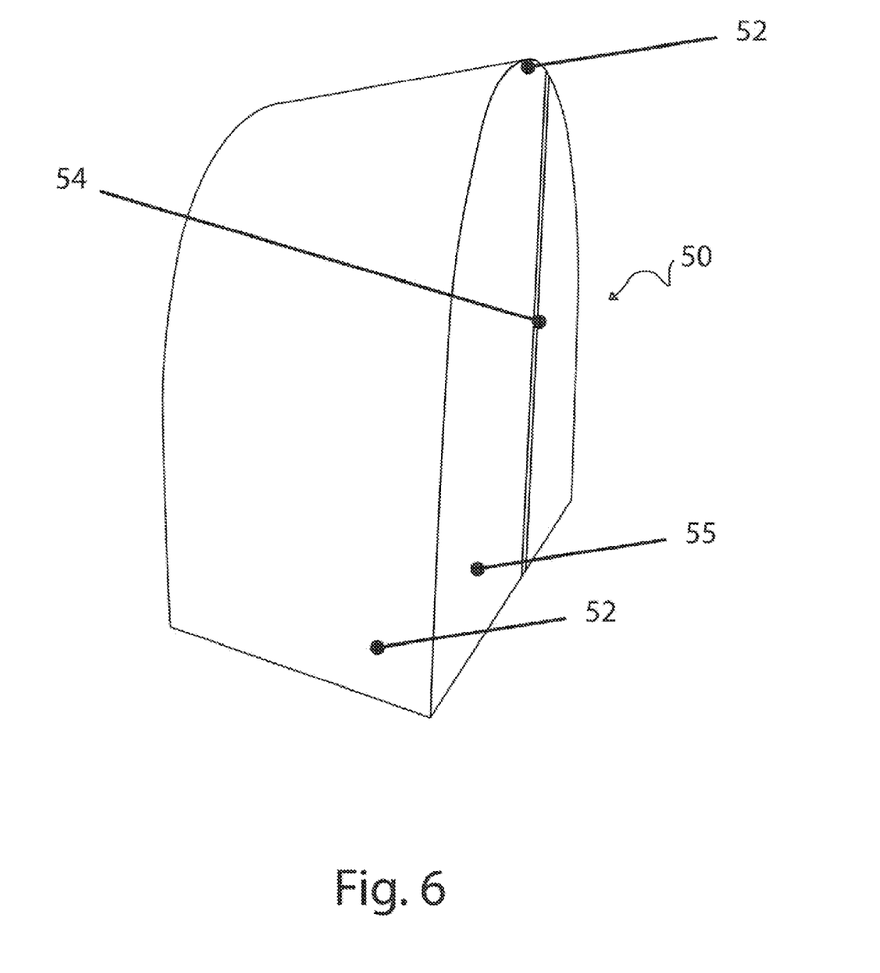
FIG. 6 shows a rear perspective view of housing made from an embodiment of the coated polyurethane building panel according to the invention.

In yet a further exemplary embodiment, FIGS. 5 and 6 show housing made from an embodiment of the coated polyurethane panel according to the invention. The unit (50) (or 'Pod') shown can be used to construct modular ('Podula') housing in which several Pods are attached together. Such housing can be either temporary or permanent.

The embodiment of the Pod (50) shown includes the following components:
  An Aptane™ P258/B900 Multipanel of 1200 mm×2400 mm used as the floor (51).
  1200 mm×2400 mm Aptane™ P258/B900 Multipanels used to form the walls (52, 55 and 56). The tip of the arc (53) is 2400 mm high, and 6 m in length.
  Door frame and supports (54) are fabricated from stainless steel.
  Support angle to base (57) is fabricated from 50 mm×50 mm×1 mm galvanised steel.
  The back (55) and front (56) walls are preferably fabricated 25 mm thick panels, whereas the floor (51) and side walls (52) are preferably fabricated from 16 mm thick panels. The panels may be coated prior to assembly with a layer of Tuff Stuff™ polyurethane elastomer of about 1 mm to 3 mm thick, preferably about 1.5 to 2 mm thick. Advantageously, the Pod housing may be shipped flat-packed and subsequently assembled onsite using appropriate adhesives and fixings. Alternatively, the Pod housing may be shipped prefabricated.
  Basic Pod features include:
  Floor
  Walls/Ceiling (1 arc)
  Door
  Window in door
  Vent
  Shelf
  Ground fixings
  Instructions
  Range variants include:
  Quantity
  Room Type
  Room Accessories—fixable to certain room types
  Colours—external and internal
  Flooring—rubber flooring for comfort
  Walls—add in and/or removable
  Doors—can be inserted/added to any panel
  Windows—1× standard size with vent option
  Solar Panels for electricity generation
  Rainwater catchment system—guttering to be approx ⅔rds way up unit on exterior, rain water storage unit to sit outside or possibly form the base of the unit.
  Septic holding tank system Example 4

Preliminary testing for the coated panels was performed using a Hydraulic Bearing Press fitted with a 50 mm diameter press tool. Uncoated Aptane™ P258/B900 Multipanel was compared with panel coated with about 1 mm Tuff Stuff™ polyurethane elastomer. All panels were of the same size of 550 mm×385 mm and supported by support battens 90 mm thick placed 250 mm apart. Panels were bent until broken, or until signs of fatigue showed. The maximum deflection achieved was 150 mm.

| Panel Thickness (mm) | Lining Thickness (mm) | Deflection (mm) | Comments | % Improvement |
|---|---|---|---|---|
| 8 | — | 95 | clean break to centre | — |
| 8 | 1 | 150 | unbroken with signs of fatigue | 63.3 |
| 12 | — | 70 | clean break to centre | — |
| 12 | 1 | 150 | unbroken with signs of fatigue | 46.7 |
| 16 | — | 60 | clean break to centre | — |
| 16 | 1 | 150 | unbroken with signs of fatigue | 40.0 |
| 18 | — | 65 | clean break to centre | — |
| 18 | 1 | 120 | unbroken with signs of fatigue | 54.1 |
| 25 | — | 45 | clean break to centre | — |
| 25 | 1 | 70 | clean break on underside external to press, internal side intact | 64.3 |
| 30 | — | 30 | broken in 3 pieces | — |
| 30 | 1 | 50 | clean break on underside external to press, internal side intact | 60.0 |

Signs of fatigue included the formation of pressure lines under the surface of the Tuff Stuff™ polyurethane elastomer layer.

As shown, Aptane™ P258/B900 Multipanel coated with Tuff Stuff™ polyurethane elastomer has improved flexibility characteristics when compared to uncoated panels.

Example 5

Preliminary compression testing was performed using a Hydraulic Bearing Press fitted with a 50 mm diameter press tool. Uncoated Aptane™ P258/B900 Multipanel was compared with panel coated with about 1 mm Tuff Stuff™ polyurethane elastomer. Panels of the same size used in Example 4 were supported with 90 mm support blocks which were positioned directly under the press tool.

The press tool formed a crater 15 mm deep in uncoated panel when pressed with 3 tonnes of pressure. Conversely, the press tool formed a crater 11 mm deep in coated panel when pressed with the same 3 tonne weight. Both uncoated and coated panels showed surface penetration.

The above results show that Aptane™ P258/B900 Multipanel coated with Tuff Stuff™ polyurethane elastomer has improved compressibility characteristics when compared to uncoated panels.

The claims defining the invention are as follows:

1. A formable building and construction panel, which is adapted to be formed into different shapes for building and construction, said panel comprising:
    a prefabricated polyurethane panel, and
    a coating applied to the prefabricated polyurethane panel, said coating comprising one or more polyurethane elastomers, said elastomers comprising one or more polyols and one or more diisocyanates,
    wherein said coating directly contacts said prefabricated panel, and wherein said coating reduces fracturing and/or breakage when the coated panel is formed into shapes in comparison to an uncoated panel.

2. The formable building and construction panel of claim 1 wherein said prefabricated panel is comprised of one or more polyether polyols.

3. The formable building and construction panel of claim 1 wherein said prefabricated panel is comprised of one or more polyester polyols.

4. The formable building and construction panel of claim 1 wherein said prefabricated panel is comprised of one or more diisocyanates.

5. The formable building and construction panel of claim 4 wherein said prefabricated panel is comprised of one or more aromatic diisocyanates.

6. The formable building and construction panel of claim 4 wherein said prefabricated panel is comprised of one or more aliphatic diisocyanates.

7. The formable building and construction panel of claim 4 wherein said prefabricated panel is comprised of one or more diisocyanates selected from the group consisting of tetramethylene, hexamethylene, octamethylene and decamethylene diisocyanates, and their alkyl substituted homologs, 1,2-, 1,3- and 1,4-cyclohexane diisocyanates, 2,4- and 2,6-methyl-cyclohexane diisocyanates, 4,4'- and 2,4'-dicyclohexyl-diisocyanates, 4,4'- and 2,4'-dicyclohexylmethane diisocyanates, 1,3,5-cyclohexane triisocyanates, saturated (hydrogenated) polymethylenepolyphenylenepolyisocyanates, isocyanatomethylcyclohexaneisocyanates, isocyanatoethyl-cyclohexane isocyanates, bis(isocyanatomethyl)-cyclohexane diisocyanates, 4,4'- and 2,4'-bis(isocyanatomethyl)dicyclohexane, isophorone diisocyanate, 1,2-, 1,3-, and 1,4-phenylene diisocyanates, 2,4- and 2,6-toluene diisocyanate, 2,4'-, 4,4'- and 2,2-biphenyl diisocyanates, 2,2'-, 2,4'- and 4,4'-diphenylmethane diisocyanates, polymethylenepolyphenylenepolyisocyanates (polymeric MDI), and 1,2-, 1,3-, and 1,4-xylylen diisocyanates.

8. The formable building and construction panel of claim 1 wherein said polyols in the polyurethane elastomers are polyether polyols.

9. The formable building and construction panel of claim 1 wherein said polyols in the polyurethane elastomers are polyester polyols.

10. The formable building and construction panel of claim 1 wherein said polyurethane elastomers are comprised of one or more aromatic diisocyanates.

11. The formable building and construction panel of claim 1 wherein said polyurethane elastomer is comprised of one or more aliphatic diisocyanates.

12. The formable building and construction panel of claim 1 wherein said polyurethane elastomer is comprised of one or more diisocyanates selected from the group consisting of tetramethylene, hexamethylene, octamethylene and decamethylene diisocyanates, and their alkyl substituted homologs, 1,2-, 1,3- and 1,4-cyclohexane diisocyanates, 2,4- and 2,6-methyl-cyclohexane diisocyanates, 4,4'- and 2,4'-dicyclohexyl-diisocyanates, 4,4'- and 2,4'-dicyclohexylmethane diisocyanates, 1,3,5-cyclohexane triisocyanates, saturated (hydrogenated) polymethylenepolyphenylenepolyisocyanates, isocyanatomethylcyclohexaneisocyanates, isocyanatoethyl-cyclohexane isocyanates, bis(isocyanatomethyl)-cyclohexane diisocyanates, 4,4'- and 2,4'-bis(isocyanatomethyl)dicyclohexane, isophorone diisocyanate, 1,2-, 1,3-, and 1,4-phenylene diisocyanates, 2,4- and 2,6-toluene diisocyanate, 2,4'-, 4,4'- and 2,2-biphenyl diisocyanates, 2,2'-, 2,4'- and 4,4'-diphenylmethane diisocyanates, polylmethylenepolyphenylenepolyisocyanates (polymeric MDI), and 1,2-, 1,3-, and 1,4-xylylen diisocyanates.

13. The formable building and construction panel of claim 1 wherein said prefabricated panel is comprised of from about 20% to about 40% by weight of polyether polyol.

14. The formable building and construction panel of claim 1 wherein said prefabricated panel is comprised of from about 30% to about 60% by weight of diphenylmethane diisocyanate.

15. The formable building and construction panel of claim 1 wherein said prefabricated panel and/or polyurethane elastomer coating further comprise additives selected from the group consisting of catalysts, blowing agents, surfactants, flame retardants, stabilizers, anti-discolouration compounds and pigments.

16. The formable building and construction panel of claim 15 wherein said prefabricated panel further comprises from about 2% to about 8% by weight of one or more blowing agents.

17. The formable building and construction panel of claim 1 wherein the polyurethane elastomer comprises from about 14% up to about 20% by weight of diethylene glycol.

18. The formable building and construction panel of claim 1 wherein the polyurethane elastomer comprises from about 3% up to about 5% by weight of diethyltoluenediamine.

19. The formable building and construction panel of claim 1 wherein the polyurethane elastomer comprises from about 50% up to about 60% by weight 4,4'-diphenylmethane diisocyanate (MDI).

20. The formable building and construction panel of claim 1 wherein the polyurethane elastomer comprises from about 20% up to about 60% by weight modified 4,4'-diphenylmethane diisocyanate.

21. The formable building and construction panel of claim 1 wherein the polyurethane elastomer comprises from 5% up to about 30% by weight diisooctyl phthalate.

22. The formable building and construction panel of claim 1 wherein said coated panel is formable at a temperature less than about 100° C.

23. The formable building and construction panel of claim 22 wherein said coated panel is formable at a temperature less than about 75° C.

24. The formable building and construction panel of claim 22 wherein said coated panel is formable at a temperature less than about 50° C.

25. The formable building and construction panel of claim 22 wherein said coated panel is formable at a temperature less than about 30° C.

26. The formable building and construction panel of claim 22 wherein said coated panel is formable at ambient temperature.

27. The coated panel of claim 1 wherein said coated panel is for the construction of:
   wet areas, temporary housing, walls, floors, ceilings, windows, vents, doors, solar panels, rainwater catchment devices, septic holding tanks,
   water features, or
   planter boxes.

28. The formable building and construction panel of claim 1 wherein said one or more polyurethane elastomers comprise greater than about 60% by weight of polyethylene/polypropylene glycol glyceryl ether.

29. The coated panel of claim 1 wherein the improvement in formability of said coated panel is at least 40% in comparison to an uncoated panel.

30. A method of blast mitigation comprising:
   applying at least one formable, coated polyurethane panel of claim 1 or 22 to an object that is to be protected against a blast.

31. The formable building and construction panel comprising:
   a prefabricated polyurethane panel comprising, by weight:
   Polyether Polyol: about 20% to about 40%
   Diphenylmethane Diisocyanate: about 30% to about 60%
   Blowing Agent: about 2% to about 8%
   Fire Retardant: up to about 10%
   and a polyurethane coating comprises:

| Component A comprising, by weight: | |
|---|---|
| polyethylene/polypropylene glycol glyceryl ether | greater than about 60% up to about 80% |
| diethylene glycol | from about 14% up to about 20% |
| diethyltoluenediamine | from about 3% up to about 5% |
| Component B comprising, by weight: | |
| 4,4'-diphenylmethane diisocyanate (MDI) | from about 50% up to about 60% |
| modified MDI | from about 20% up to about 60% |
| diisooctyl phthalate | from 5% up to about 30% | wherein Component A is mixed with Component B to form the coating, wherein said coating is applied and directly contacts said prefabricated panel, and wherein said coating reduces fracturing and/or breakage when the coated panel is formed into shapes in comparison to an uncoated pane.

32. The formable building and construction panel of claim 31 wherein the improvement in formability of said coated panel is at least 40% in comparison to an uncoated panel.

33. A method of manufacturing a formable building and construction panel, which is adapted to be formed into different shapes for building and construction, said method comprising:
   coating a prefabricated polyurethane panel, said coating comprising one or more polyurethane elastomers, said elastomers comprising one or more polyols and one or more diisocyanates,
   wherein said coating directly contacts said prefabricated panel, and wherein said coating reduces fracturing and/or breakage when the coated panel is formed into shapes in comparison to an uncoated panel.

34. The method according to claim 33, further comprising the step of forming the coated polyurethane panel into a desired shape.

* * * * *